SUFFICIENT-LOOP SENSOR

Filed Sept. 20, 1963 3 Sheets-Sheet 1

INVENTORS:
J. F. GEBACZ
D. A. FRONCKOWIAK

BY Spencer E. Olson
ATTORNEY

June 28, 1966 D. A. FRONCKOWIAK ET AL 3,258,213

SUFFICIENT-LOOP SENSOR

Filed Sept. 20, 1963 3 Sheets-Sheet 2

INVENTORS:
J. F. GEBACZ
D. A. FRONCKOWIAK

BY Spencer E. Olson

ATTORNEY

INVENTORS:
J.F. GEBACZ
D.A. FRONCKOWIAK

BY Spencer E. Olson

ATTORNEY

United States Patent Office 3,258,213

Patented June 28, 1966

3,258,213

SUFFICIENT-LOOP SENSOR

Daniel A. Fronckowiak, Buffalo, and John F. Gebacz, Williamsville, N.Y., assignors to Sylvania Electric Products Inc., a corporation of Delaware Filed Sept. 20, 1963, Ser. No. 310,304
6 Claims. (Cl. 242—55.11)

This invention relates generally to tape transport apparatus and more specifically to buffer wells for a high speed incremental tape transport.

In systems in which it is necessary to record or transmit information at specific short intervals for cyclic or non-cyclic operation, for example, in equipment for storing programs for industrial control systems or for automatic tool operations, an incremental tape transport system is often used. These systems require a substantially instantaneous start and stop capability, so that the interval between command and motion of the tape, and between motion of the tape and stop is of the order of milliseconds. Normally, the equipment includes a supply reel from which tape is drawn and carried past a recording head. Because of the inherent static inertia of a non-driven tape supply reel, it is necessary to provide a low inertia buffer between the reel and the recording head, if tape speeds of 100 inches per second or greater are to be achieved in a matter of milliseconds. In the incremental tape recorder, it is common to provide a reservoir with a loose loop of tape to achieve the required low inertia buffer. The problem, however is to insure that the loop of tape in the buffer well before each increment of motion of the tape is sufficiently long to accomodate that increment.

One commonly used method for providing and maintaining a loop of tape between the tape supply reel and the recording head is to fill the reservoir or well to capacity at the time a new reel of tape is inserted in the machine. As incremental operation occurs, the loop length is shortened with each operational period, but enough tape is provided in the loop initially to compensate for the total contemplated slippage between the supply and take-up reels, so that the reel of tape is exhausted before the length of tape in the buffer well is totally depleted. At that time, a new reel of tape is installed and the reservoir refilled. This method has the disadvantage that it is difficult to predict with sufficient accuracy the loop length necessary to compensate for total slippage during a full reel of tape. Slippage rates between the output reel and the supply reel may change significantly over a period of time with the result that the loop may be lost. Also, the necessity of packing a large reservoir with tape increases the tendency of the tape to jam the mechanism, and, furthermore, occupies a large portion of thte total volume of the machine.

A second method for maintaining a low inertia loop has been the use of movable tension arms around which the tape is threaded. The tape is threaded around idler guides whose axes are movable and lightly spring loaded, and as slippage occurs the loop shortens and the positions of the idler axes are changed. This movement actuates a switch which signals the supply reel to provide more tape for the buffer loop. This method, however, tends to increase the drag on the tape, which, in turn, increases the inertia, a critical disadvantage when it is considered that the ultimate purpose of the buffer is to decrease the inertia.

In still another type of transport apparatus, the amount of tape in a buffer well between the supply reel and the recording head and take-up reel is controlled by sensing the amount of tape in the buffer well and adjusting the speed of the supply reel. The amount of tape in the buffer well is sensed by such means as weight sensing apparatus or photoelectric sensing apparatus, the output of which controls the speed of the supply reel to maintain a predetermined length of tape in the buffer well. These techniques both require a relatively large volume, and suffer the disadvantage that foreign matter, such as dirt, may affect the accuracy of the device. For instance, the foreign matter could obstruct the light sensors in a photoelectric sensor, or significantly increase the weight sensed in the weighing device, with attendant errors in the control signal applied to the reel driver circuit.

In another popular type of tape transport, a vacuum well is disposed between the storage reel and the tape capstan for minimizing the inertia caused by the relatively high mass of the storage reel. The vacuum well stores a predetermined length of tape which reacts to fast start or stop times by being shortened or lengthened. The vacuum system is useful to overcome the inertia problem in many applications, but it is a complex mechanism and occupies a great deal of space because of its length and the need for a compressor.

With an appreciation of the foregoing limitations of prior art methods of maintaining a slack loop in tape transport apparatus, applicants have as a primary object of this invention to provide an improved buffer well device for maintaining a low inertia loop of tape between the supply reel and the recording head or output reel of a high speed incremental tape reocrder.

Another object of the invention is to provide a buffer well and sensor for maintaining a loop of tape in the well in a tape recorder employing tape having a conductive backing.

A still further object of the invention is to provide a buffer well and tape loop sensor of compact and simple construction, and which adds a minimum of drag to the tape.

Briefly, these objects are accomplished by a buffer well, which features a pair of smooth guides for containing the tape loop and guiding it into a generally semi-circular area at the bottom of the well, the semi-circular area being defined by a pair of arcuate conductive members spaced and insulated from each other and each being in a plane perpendicular to the plane of the tape. The arcuate members are appropriately connected in a control circuit in which they act as a switch. As the length of the conductively backed tape increases in the tape well, the stiffness of the tape forces it against the arcuate conductive members, thereby bridging the gap between the conductive members to close the control circuit in which they are connected, in order to stop the introduction of tape into the well. As part of the slack loop is used, the tape is pulled away from the arcuate members, opening the control circuit and signalling that more tape is required.

Other objects, features, and modifications of the invention will be apparent from the following description and reference to the accompanying drawings, in which.

Figure 1:
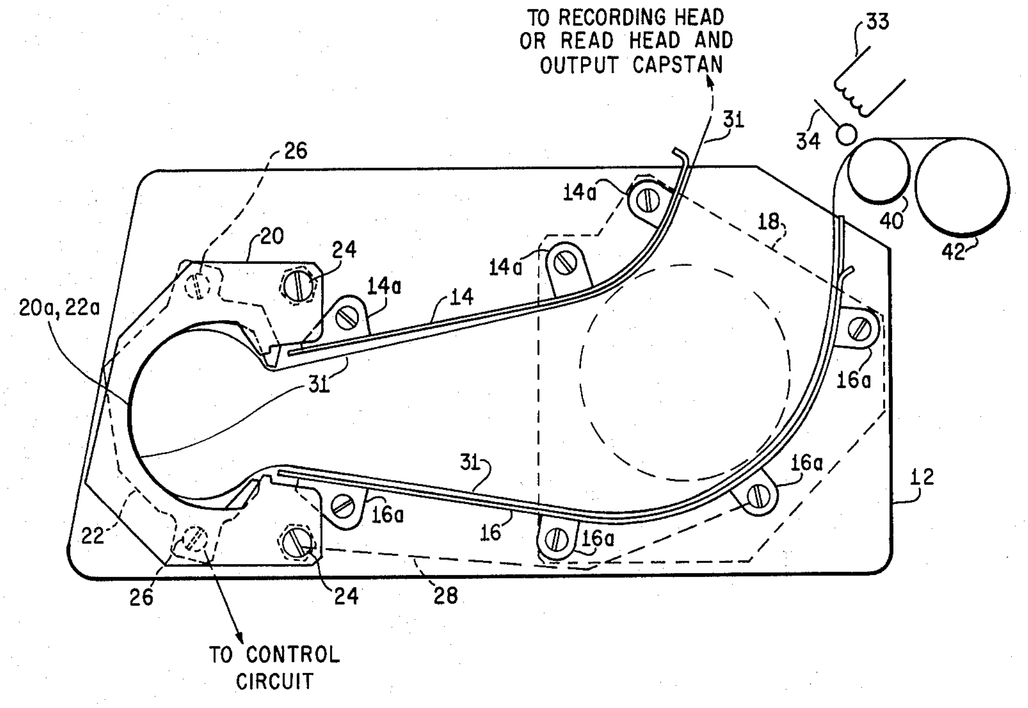
FIG. 1 is a top plan view of the buffer well according to the invention.
Figure 2:
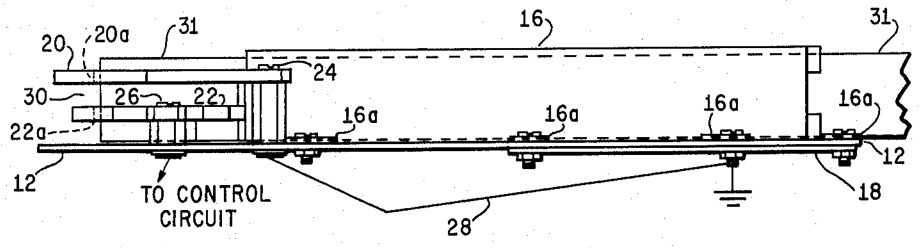
FIG. 2 is a front elevation view of the apparatus shown in FIG. 1.
Figure 3A:
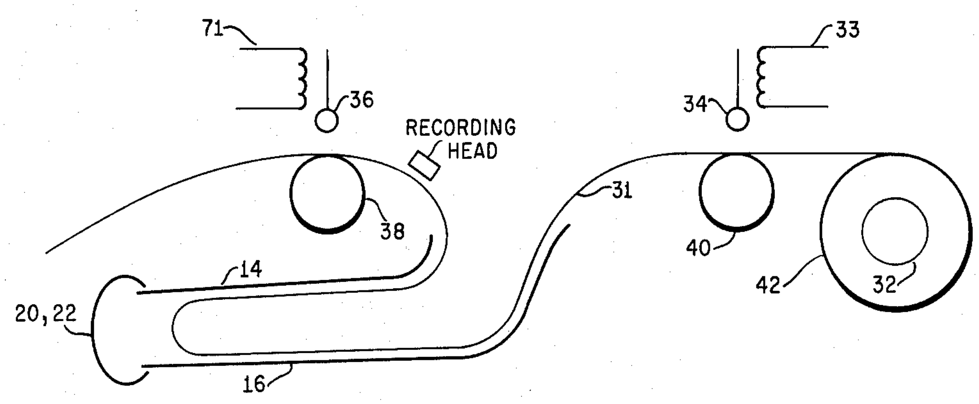
Figure 3B:
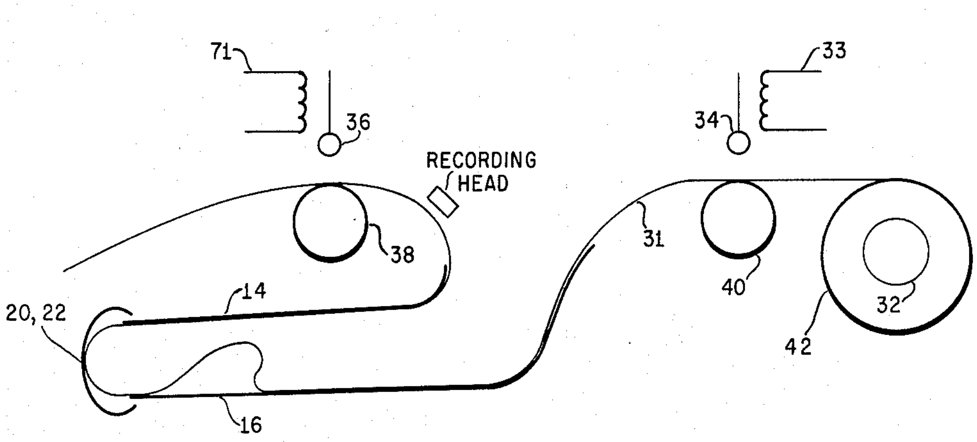
Figure 4:
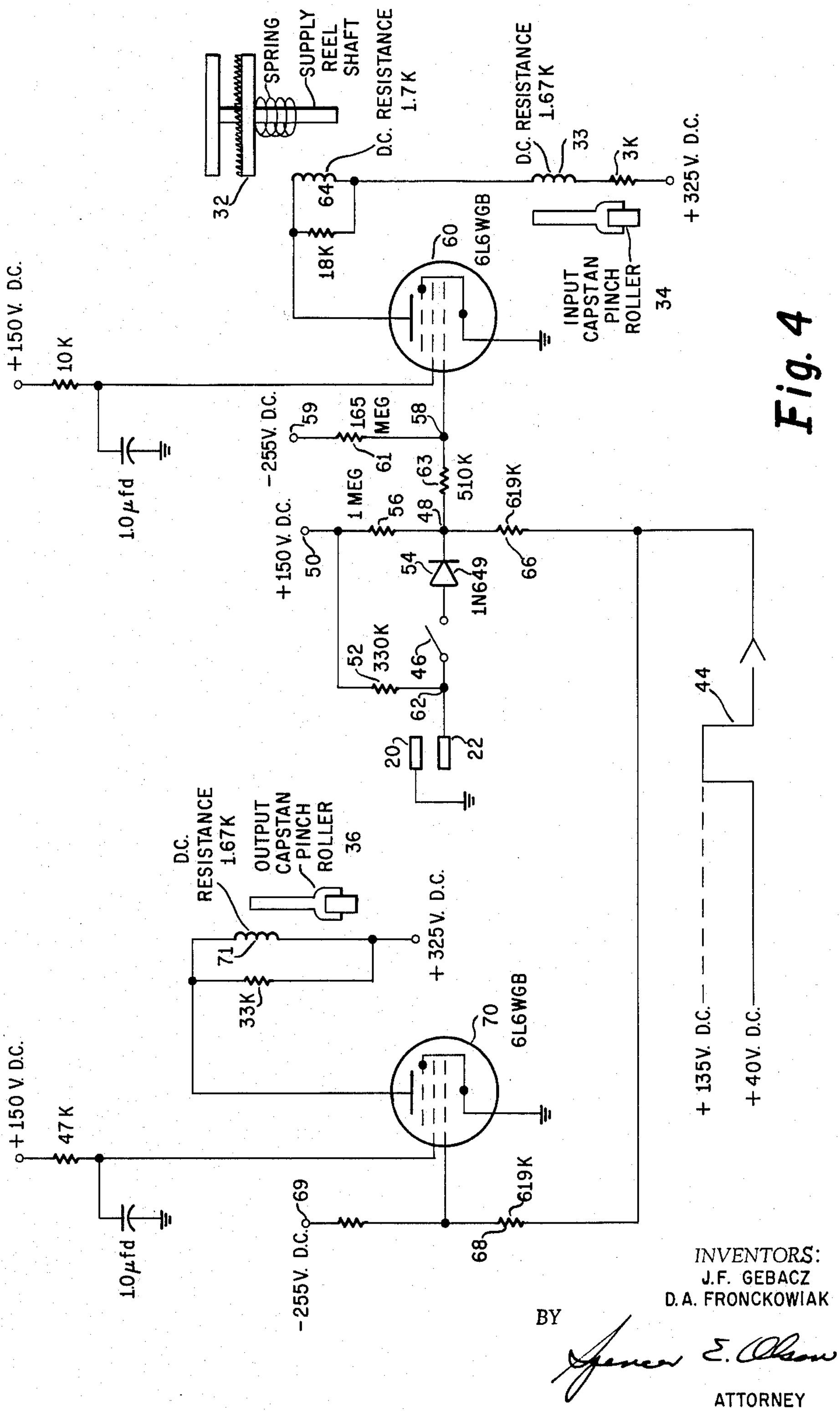

FIG. 3*a* is a schematic representation of the buffer well and the various control devices associated therewith, with the tape shown in its approximate position during running operation;

FIG. 3*b* is a schematic representation of the tape loop buffer well depicting the buckling action of the tape at the end of the tape feed operation; and FIG. 4 is a schematic diagram of one form of control circuit useful with the buffer well and tape loop sensor shown in FIGS. 1 and 2.

Referring now to FIGS. 1 and 2, the buffer well and tape loop length sensor mechanism includes a base plate 12, preferably formed of insulating material, on which is mounted a pair of upstanding curved tape guiding members 14 and 16. These members are formed of thin sheet metal, smoothly polished on their inner surface, and are respectively secured to the base plate by outwardly extending tabs 14*a* and 16*a*, to present smooth and unobstructed surfaces for guiding the tape. Both of the members 14 and 16 are curved at the input end of the well, member 14 having a smaller radius of curvature, with both members having straight portions which converge toward each other. A conductive plate 18 is secured to the underside of the base plate, with both of the guide members electrically connected thereto by screws or bolts extending through the tabs 14*a* and 16*a*.

The bottom end of the well is defined by a pair of conductive members 20 and 22 mounted parallel to the plane of the base plate 12 and supported in spaced relationship, one above the other, by pairs of studs 24 and 26, respectively. Members 20 and 22 are generally arcuate or C-shaped with identical inside contours 20*a* and 22*a*, respectively, which are vertically aligned. As best seen in FIG. 1, both members 20 and 22 are spaced from guide members 14 and 16 to be electrically insulated therefrom, and by virtue of the insulating base plate 12, are electrically insulated from each other. However, for reasons which will be apparent, member 20 is otherwise electrically connected to the guide members 14 and 16 through conductive ground plate 18 by a wire 28 connected from stud 24 to the conductive plate. Thus, all of the conductive parts of the assembly are electrically connected together except for arcuate member 22, which is insulated from the other parts. The gap 30 between the members 20 and 22 provides a normally open switch, adapted to be closed by the conductive backing on the tape 31, which is forced against the arcuate surfaces 20*a* and 22*a* when the tape in the well is of sufficient length.

Referring now to FIG. 3*a*, the tape transport device is operated upon initiation of a command signal, the pulse width of which determines the duration of the tape operation. The command signal is effective to remove supply reel brake 32 and to press pinch roller 34 into engagement with the input capstan 40. Simultaneously, the command pulse causes the pinch roller 36 to be applied to the output capstan 38. The output capstan 38 immediately starts to pull tape from the reservoir 14, 16 with essentially instantaneous acceleration, because of the low inertia provided by the sufficient length of slack tape previously provided in the reservoir. By the time the input capstan 40 overcomes the inertia of the supply reel and starts feeding tape into the well at the same speed as the output capstan is pulling the tape from the well, the tape loop is shortened, so that the reservoir is only one-half to three-quarters full during this portion of the operation, as shown in FIG. 3*a*. At the end of the command pulse, which has a duration of approximately two seconds in this example, the control circuit (to be described) causes the pinch roller 36 to be withdrawn from output capstan 38, but pinch roller 34 is maintained in driving relationship with input capstan 40 to continue feeding tape into the reservoir. When the reservoir is filled, the conductive backing of the tape closes the gap between the sensor plates 20 and 22, deenergizing the feed mechanism by disengaging the input capstan pinch roller and braking the supply reel. Because of its high inertia, the supply reel 42 will not immediately stop upon application of the brake, resulting in buckling of the tape in the tape well as shown in FIG. 3*b*, at the actual end of supply reel rotation. Thus, it is seen that the command signal is the sole controlling factor for the output capstan pinch roller. The command signal, however, also controls the input capstan pinch roller and the supply reel brake, but not exclusively. The command signal causes the input and output capstan pinch rollers to drive the tape and the supply reel to be released, but the end of the command pulse operates only the output pinch roller by withdrawing it from its associated capstan. The input capstan pinch roller is disengaged, and the brake reapplied to the supply reel only upon electrical connection between the bottom-of-the-well tape sensors 20 and 22.

The above-described operation of the output and input capstan pinch rollers and the supply reel brake is controlled by the circuit shown in FIG. 4. The arcuate member 20 is shown as a contact connected to ground and member 22 is connected via junction 62 and resistor 52 to a source of positive potential represented by terminal 50, and through switch 46, diode 54, and resistor 63 to the control grid of electron tube 60. The tube 60 is biased by a source of negative potential, represented by terminal 59, which is connected to the grid through resistor 61, and by a source of positive potential connected to the screen grid. A resistor 56, connected between voltage source 50 and junction 48, and a connection through resistor 66 to junction 48 for the signal pulse 44 completes the input circuit for tube 60. The signal pulse is also applied to the control grid of tube 70 through resistor 68, tube 70 being biased by a source of negative potential represented by terminal 69 and a source of positive potential connected to its green grid. The plate of tube 60 is connected through serially connected solenoid windings 64 and 33, which control the supply reel brake 32 and the input capstan pinch roller 34, respectively, to a source of positive potential. The plate of tube 70 is connected through solenoid winding 71, which controls output capstan pinch roller 36, to a source of positive potential. In a circuit which has been successfully operated the components of the circuit were of the values indicated on the drawing.

In operation, to ready the system for receipt of the command signal 44, the operator closes the switch 46, causing the voltage at junction 48 to rise to about +100 volts. This voltage rise is caused by the division of the potential of source 50 between the resultant resistance of 52 and 56, in parallel, and resistor 66 in series with the static level of approximately +40 volts of the command signal. With the switch 46 open, the voltage at junction 48 is only about +30 volts. With the switch 46 closed, the potential at junction 48 is sufficient to raise the voltage at junction 58 from a normally negative value, which keeps tube 60 cut-off, to a nearly zero bias voltage, thereby causing tube 60 to conduct and energize the winding 64 of supply reel brake 32 and solenoid winding 33 of the input capstan pinch roller 34. The energization of winding 64 releases brake 32, allowing supply reel 42 to rotate, and energization of coil 33 causes the pinch roller 34 to engage input capstan 40 to feed the tape 31 into the tape well.

When the tape well is filled, the conductive backing on tape 31, which is relatively stiff, electrically connects the sensor plates 20 and 22, closing the circuit to ground. The resistance of the conductive backing across the gap between sensor plates 20 and 22 is about 20K ohms, which reduces the voltage at junction 62 by voltage divider action to approximately +6 to +16 volts. The diode 54 is thereby reverse-biased and the voltage at point 48 returns to about +30 volts, which allows the grid of tube 60 to return to a negative value sufficient to cut off tube 60. This results in de-energization of windings 64 and 33 and attendant application of the brake 32 to the supply reel 42 and disengagement of the pinch roller 34 from the input capstan.

The system is then ready for an incoming command signal, which is applied in parallel through resistor 66 to point 48 and through resistor 68 to the grid of tube 70. The command signal, which may have an excursion from a static level of approximately +40 volts to approximately +135 volts, causes the voltage at point 48 to rise to about +100 volts, thereby raising the voltage at grid of tube 60 to about zero volts, causing tube 60 to conduct to thereby release the supply reel brake and force pinch roller 34 into engagement with capstan 40. Simultaneously, the command pulse 44 raises the potential at the grid of tube 70 to about zero, causing it to conduct through winding 71 to force pinch roller 36 into engagement with output capstan 38. Tape is pulled from the tape well substantially instantaneously, but by the time the input capstan overcomes the inertia of the supply reel and starts feeding tape into the tape well at the same speed as the output capstan, the length of the tape loop is reduced. A the end of the command pulse, the grid bias of the output drive tube 70 is returned to a negative value, the tube is cut off, and the output capstan pinch roller is withdrawn. The voltage at point 48 is maintained at approximately +100 volts by the now open sensor plate switch 20 and 22, since the tape well is only about one-half to three-quarters full. Tape continues to be fed into the well, therefore, until the sensor plate switch is closed by the conductive backing of the tape.

It has been previously mentioned that guide members 14 and 16 and arcuate member 22 are electrically connected together and grounded by a conductive plate 18. The purpose is to discharge the electrostatic charge that would otherwise build up on the smooth guide members by the rubbing of the tape thereon. Unless discharged, the charge may cause electrotsatic attraction of the tape to the guide members which would interfere with the free motion of the tape through the well. It will be understood that members 14, 16 and 18 may be grounded by means other than the ground plate 18, but the plate is a convenient and compact means for connecting these members to a common ground.

From the foregoing it is apparent that the tape well and sensor plate switch combine to maintain an unloaded loop of tape which affords a high initial speed capability, and to provide a reservoir for the extra tape advanced by the supply reel following the end of a tape command operation caused by the inertia of the supply reel. Accordingly, at the recording head, the tape starts and stops substantially instantaneously and without risk of tape breakage.

As alternatives to the foregoing illustrative embodiment, it is contemplated that a signalling function for indexing or controlling the program of a computer may be provided by applying the conductive backing to the tape in a pattern according to the desired function and placing an additional set of sensor plates in the device on the opposite side of the tape from the recording head for sensing the pattern of the conductive backing.

The diode 54 in FIG. 4 is included in the sensor plate circuit to overcome chatter of the input pinch roller solenoid which could result from poor tape contact when the reservoir is filled. The diode has approximately a +30 volts D.C. back-bias to isolate junction 48 from small voltage variations at point 62 (approximately from +6 v. to +16 v.) due to variations in the resistance value to ground effected by the tape-shorted sensor plates. Without the diode, these voltage variations at junction 62 would appear at junctions 48 and 58 and cause chattering of the pinch roller. This chatter does not severely interfere with proper functioning and the diode could in some cases be omitted from the device circuit. Also, the function switch 46 may be omitted for certain applications, and the device may be used to continuously maintain a low inertia loop in a non-incremental type tape transport.

From the foregoing it is seen that the applicants have provided a buffer well and loop length sensor having the low drag advantage of a vacuum column without the bulk and complexities of a vacuum system. The device is very compact, being shown approximately in full size in FIG. 1 for use with ⅝″ tape, with simple reliable and inexpensive construction. In addition, the design minimizes the effects of temperature, humidity, shock, and vibration. Further, it is not sensitive to mounting attitudes, e.g. it may be rotated 90° or 180° and still function satisfactorily.

Although preferred, illustrative, and alternative embodiments have been shown and described, changes and modifications will occur to ones skilled in the art. It is the intention, therefore, that the invention not be limited to the features shown and described, except as such limitations appear in the following claims.

What is claimed is:

1. In a transport system for conductively-backed tape including a tape supply reel, an input capstan arranged to draw tape from the supply reel, a transducer over which the tape is carried, and an output capstan arranged to draw the tape over the transducer, a buffer well for maintaining a sufficient slack loop of tape between the input capstan and the output capstan, comprising: a base plate, a pair of smooth, spaced apart guide members secured to said base plate and upstanding therefrom to define a tape-receiving channel having an input end and a bottom end, and a pair of arcuate members formed of conductive material insulated from each other and supported parallel to said base plate, spaced one above the other, and having aligned arcuate contours oriented relative to said guide members to define the bottom end of said channel, said arcuate members being operative as a normally open switch adapted to be closed in response to the bridging of the space therebetween by a loop of conductively-backed tape filling said tape-receiving channel.

2. In a transport system for conductively-backed tape including a tape supply reel, an input capstan arranged to draw tape from the supply reel, a transducer over which the tape is carried, and an output capstan arranged to draw the tape over the transducer, a buffer well for maintaining a sufficient slack loop of tape between the input capstan and the output sapstan, comprising: a base plate, a pair of smooth, spaced apart guide members secured to said base plate and upstanding therefrom to define a tape-receiving channel having an input end and a bottom end, a pair of arcuate members formed of conductive material insulated from each other and supported parallel to said base plate, spaced one above the other, and having aligned arcuate contours oriented relative to said guide members to define the bottom end of said channel, said arcuate members being operative as a normally open switch adapted to be closed in response to the bridging of the space therebetween by a loop of conductively-backed tape filling said tape-receiving channel, and a circuit including said switch operative in response to closure thereof to terminate the drawing of tape from said supply reel.

3. In a transport system for conductively-backed tape including a tape supply reel, an input capstan arranged to draw tape from the supply reel, a transducer over which the tape is carried, and an output capstan arranged to draw the tape over the transducer, a buffer well for maintaining as sufficient slack loop of tape between the input capstan and the output capstan, comprising: a base plate formed of insulating material, a pair of smooth, curved, spaced apart guide members formed of conductive material secured to said base plate and upstanding therefrom to define a tape-receiving channel having an input end and a bottom end, a pair of arcuate members formed of conductive material insulated from each other and supported parallel to said base plate, spaced one above the other, and having aligned arcuate contours facing said channel and disposed to define the bottom end of said channel, and means electrically connecting one of said arcuate members to said guide members, the other of said arcuate members being insulated from said guide members, said arcuate members being operative as a normally open switch adapted to be closed in response to the bridging of the space therebetween by a loop of conductively-backed tape filling said tape-receiving channel.

4. In a transport system for conductively-backed tape including a tape supply reel, an input capstan arranged to draw tape from the supply reel, a transducer over which the tape is carried, and an output capstan arranged to draw the tape over the transducer, a buffer well for maintaining a sufficient slack loop of tape between the input capstan and the output capstan, comprising: a base plate formed of insulating material, a pair of smooth, curved, spaced apart guide members formed of conductive material secured to said base plate and upstanding therefrom to define a tape-receiving channel having an input end and a bottom end, a pair of arcuate members formed of conductive material insulated from each other and supported parallel to said base plate, spaced one above the other, and having aligned arcuate contours facing said channel and disposed to define the bottom end of said channel, means electrically connecting one of said arcuate members to said guide members, the other of said arcuate members being insulated from said guide members, said arcuate members being operative as a normally open switch adapted to be closed in response to the bridging of the space therebetween by a loop of conductively-backed tape filling said tape-receiving channel, and a circuit including said switch operative in response to closure thereof to terminate the drawing of tape from said supply reel.

5. In a transport system for conductively-backed tape including a tape supply reel having a solenoid-actuated brake, an input capstan having a solenoid-actuated pinch roller, which is operative when actuated by energization of the solenoid to draw tape from the supply reel, a transducer over which the tape is carried, and an output capstan arranged to draw the tape over the transducer, apparatus for maintaining a sufficient slack loop of tape between the input capstan and the output capstan, said apparatus comprising a control circuit for selectively controlling the energization of the solenoids of said input and output capstans and said brake, a buffer well supported to receive a slack loop in the tape between said input capstan and said output capstan, said well comprising a base plate disposed normal to the flat surface of the tape, a pair of smooth, spaced apart guide members supported on said base plate and upstanding therefrom to define a channel for said tape loop having an input end and a bottom end, a pair of arcuate conductive members insulated from each other and supported parallel to said base plate and spaced one above the other a distance less than the width of the tape, said arcuate members being supported to close the bottom end of said channel and having aligned arcuate contours facing said channel, means connecting one of said arcuate members to a point of reference potential in said control circuit, and means connecting the other of said arcuate members to another point in said control circuit, said arcuate members being operative as a normally open switch operative in response to the bridging of the space therebetween by a loop of conductively-backed tape filling said channel.

6. In a transport system for conductively-backed tape including a tape supply reel having a solenoid-actuated brake, an input capstan having a solenoid-actuated pinch roller, which is operative when actuated by energization of the solenoid to draw tape from the supply reel, a transducer over which the tape is carried, and an output capstan arranged to draw the tape over the transducer, apparatus for maintaining a sufficient slack loop of tape between the input capstan and the output capstan, said apparatus comprising a control circuit for selectively controlling the energization of the solenoids of said input and output capstans and said brake in response to a command signal and said input capstan and said brake in response to a switch, a buffer well supported to receive a slack loop in the tape between said input capstan and said output capstan, said well comprising a base plate formed of insulating material disposed normal to the flat surface of the tape, a pair of smooth, spaced apart guide members supported on said base plate and upstanding therefrom to define a channel for said tape loop having an input end and a bottom end, a pair of arcuate conductive members insulated from each other and supported parallel to said base plate and spaced one above the other a distance less than the width of the tape, said arcuate members being supported to close the bottom end of said channel and having aligned arcuate contours facing said channel, means electrically connecting one of said arcuate members to said guide members and to a point of reference potential in said control circuit, and means connecting the other of said arcuate members to another point in said control circuit, said arcuate members constituting a normally open switch operative, in response to the bridging of the space therebetween by a loop of conductively-backed tape filling said channel, to close and terminate the drawing of tape from the supply reel, said control circuit being operative to receive a command signal to control said input and output capstans and said supply reel brake.

No references cited.

MERVIN STEIN, *Primary Examiner.*

G. F. MAUTZ, *Assistant Examiner.*